(No Model.)
R. T. HUNTINGTON.
BEVEL PROTRACTOR.
No. 590,226.  Patented Sept. 21, 1897.
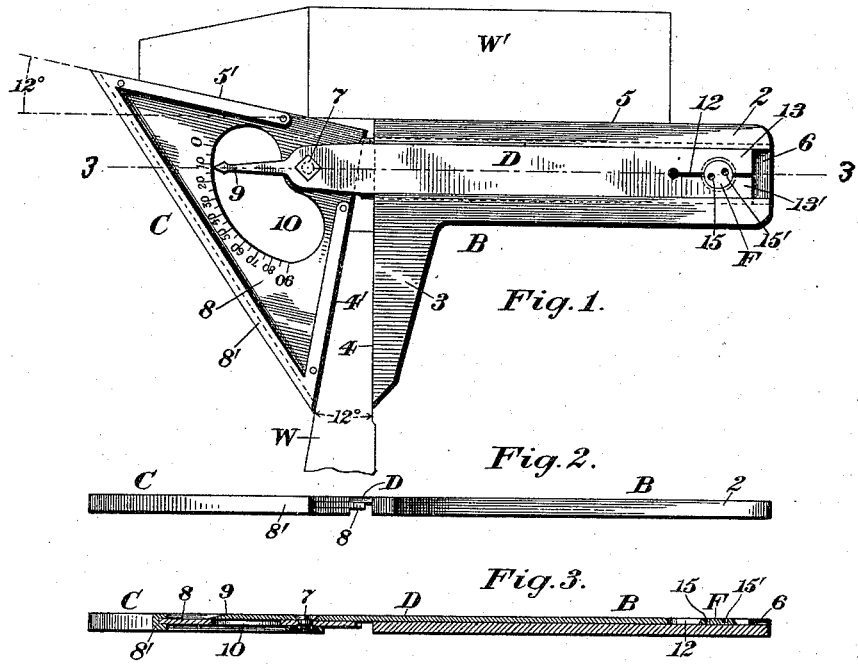
Witnesses:
Chas. H. Smith
Fred. J. Dole.
Inventor:
Richard T. Huntington.
By his Attorney,
F. H. Richards

UNITED STATES PATENT OFFICE.

RICHARD T. HUNTINGTON, OF HARTFORD, CONNECTICUT.

BEVEL-PROTRACTOR.

SPECIFICATION forming part of Letters Patent No. 590,226, dated September 21, 1897.

Application filed July 27, 1896. Serial No. 600,581. (No model.)

*To all whom it may concern:*

Be it known that I, RICHARD T. HUNTINGTON, a citizen of the United States, residing in Hartford, in the county of Hartford and State of Connecticut, have invented certain new and useful Improvements in Bevel-Protractors, of which the following is a specification.

This invention relates to measuring-tools of that class generally known as "bevel-protractors," one object of the invention being to furnish a simple and convenient tool of the class specified having a wide range of adjustment and one which may be quickly set to any desired angle and be used either as a drawing instrument for dividing circles, transferring angles, or laying off given angles, or it may be used as a bevel-protractor or taper-gage for ascertaining with precision the degrees of angles or tapers of the surfaces of a piece of work, and to so construct and organize the parts of said tool that it will be adaptable for simultaneously gaging or measuring the angles of the two oppositely-tapered or wedge faces of a piece of work irrespective of the width or diameter of said piece within the limits or range of adjustment of the tool.

In the drawings accompanying and forming part of this specification, Figure 1 is a side elevation of a measuring-tool or combined bevel-protractor and taper-gage embodying my invention, said figure showing the tool adjusted to the angles of two independent pieces of work, which pieces are shown in outline, the rectangularly-disposed gage-faces of the protracting member being shown set at an angle of approximately twelve degrees relatively to the rectangularly-disposed gage-faces of the stock or carrying member. Fig. 2 is a plan view of the measuring-tool. Fig. 3 is a longitudinal section of the measuring-tool, taken in dotted line 3 3, Fig. 1, as seen from the under side in said figure. Fig. 4 is a top view of the clamping-cam for securing the parts of the tool in adjusted position. Fig. 5 is a side view of a clamp-cam wrench. Fig. 6 is a view similar to Fig. 1, showing the two gage members of the tool at angles of approximately sixty-five degrees.

The measuring-tool, which may be properly termed a "combined bevel-protractor and taper-gage," comprises in the preferred form thereof herein shown two coöperative gage members, (designated in a general way by B and C, respectively,) each of which has two relatively rectangular gage or measuring faces, and which two members are adjustably connected together in such relative disposition that the first member may be set to bring one gage-face thereof into alinement with or at an angle to one gage-face of the second member and the other gage-face of said first member into parallelism with or at right angles to the other gage-face of said second member.

The gage member B, which may properly be termed the "stock" of the tool, is shown somewhat in the nature of a try-square, it consisting of an oblong main body portion 2, having a laterally-projecting arm 3, the inner face 4 of which arm constitutes one of the gage-faces of said member B and is disposed at right angles to the outer face 5 of said member, which outer face constitutes the other gage-face of said member.

The gage member or stock B is shown longitudinally grooved on one side face thereof to form the slideway 6, which slideway is preferably undercut or dovetailed and extends longitudinally from end to end of said member, as shown most clearly in Figs. 1 and 3 of the drawings. The other gage member C, which may be properly termed the "protractor," is herein shown in the nature of a right-angle triangular piece having two relatively rectangular gage or measuring faces 4' and 5', adapted to coact with the gage-faces 4 and 5 of the stock B when the two members B and C are assembled in coöperative relation, as hereinafter more fully described.

The protractor or gage member C is shown pivotally supported at 7 near the apex and midway between the gage-faces 4' and 5' in advance of the inner end of the gage member B upon a carrier or slide, which is designated in a general way by D, which slide is supported for longitudinal adjustment in a slideway 6 in the gage member or stock B and is held in its adjusted position by means of a suitable clamping device, (designated in a general way by F,) which will be hereinafter described.

For the purpose of adapting the measuring-tool for use as a drawing instrument the protractor-carrying slide is constructed so that the outside face thereof will lie flush with the outside face of the gage member or stock B, and the protractor or gage member C will be constructed with its side edge of a thickness equal to the thickness of the gage member or stock B, so that the tool will have no projections upon the outer faces thereof and may lie flat upon the paper or drawing-board when used as a drawing instrument, which is an important advantage in tools of this class.

For the purpose of reducing the weight of the gage member or protractor C, which, in conjunction with the other parts of the tool, will be constructed of metal, and at the same time have the outer side faces of the outer edges of said member C located in a plane corresponding to the plane of the outside face of the member B the main body 8 of said protractor may, as shown in Fig. 3, be made relatively thin and be set in a triangular frame 8', which extends around the outside edges of said body portion, said frame being shown cut away in juxtaposition to the slide D to facilitate the free movement of the protractor in the arc of a circle. This protractor has graduation or degree marks in radial relation to the pivot-point 7, on which said protractor swings, said marks being so disposed as to form a segmental reading-scale concentric to said pivot 7. The protractor-carrying slide D is shown having an index point or pointer 9, extending from one end outward beyond the pivot-point 7 and terminating in position to coöperate with the graduation-marks and facilitate the reading of the angles measured, as will be readily understood by reference to Figs. 1 and 6 of the drawings.

In the form thereof shown in the drawings the graduations of the protractor are indicated by lines designated by "0," "10," "20," "30," "40," "50," "60," "70," "80," and "90," the marks being set ten degrees apart, the forty-five-degree mark coming opposite the index-point when the gage-faces 4' and 5' are set at an angle of forty-five degrees with relation to the two gage-faces 4 and 5 of the gage member or stock B, as will be readily understood by reference to said Figs. 1 and 4.

It will be understood that the protractor will usually have a full complement of graduations up to ninety degrees and can be furnished with more, if desired.

The protractor C is shown cut away at 10 between the inner edges of the graduation-marks and the pivotal point of said protractor to facilitate the reading and also lightening the construction thereof.

As a means for securing the protractor-carrying slide in its adjusted positions longitudinally of the stock B, said slide is shown slotted at 12 at the inner end thereof to form two spreadable clamping-arms 13 and 13', and said member has a conical cam-shaped perforation near the end thereof, which intersects the slot 12 and forms a seat for a conical clamping-cam F, which is seated in said perforation, as shown in Figs. 1 and 3, between the spreadable arms 13 and 13', the said clamping-cam having the face of smallest diameter flush with the outside face of the slide and preferably having two spanner-holes 15 and 15', formed one at each side the center thereof to receive the spanner-prongs of a wrench 16, by means of which said cam may be turned to force the arms 13 and 13' outward to clamp the slide in its adjusted position.

In assembling the parts of the measuring-tool—assuming the protractor C will be pivotally secured to the protractor-carrying slide D—the clamping-cam F will be placed in operative relation in its seat between the spreadable arms 13 and 13' of the slide, as shown in Fig. 3, and the slide will then be slid into the slideway 6 of the gage member or stock B, after which the clamp-cam may be turned to clamp said parts together.

The pivot which connects the protractor C and the protractor-carrying slide D is herein shown in the nature of a bolt having an angular head countersunk into the outer face of the slide D and having a screw-threaded reduced inner end, upon which is screwed a clamping nut or washer, which bears against the opposite face of the main body portion of the protractor C, said bolt having a circular portion located between the screw-threaded and headed ends thereof, which constitutes a journal on which the protractor C may swing.

It is desired to state in the above connection that the constructions and organizations of the pivot or clamp device 7, which connects the protractor C and the slide D, and the clamp device F, which connects the slide D and the gage member B, may be materially modified without departure from this invention.

In the form of measuring-tool herein shown and described it will be seen that the gage portions 4 and 4' of the two members B and C, respectively, constitute coacting jaws between which a tapered or wedge-shaped piece of work, as W, (see Fig. 1,) may be gaged, and the angular distance between the opposite wedge-faces be accurately ascertained through the medium of the index point or pointer 9 and graduations of the protractor, and also that another piece of work, as W', having a taper coinciding to the taper of the wedge-piece W, may be simultaneously tested.

In Fig. 1 of the drawings the measuring-tool is shown testing two pieces of work having coinciding angles, and in Fig. 6 said tool is shown measuring the angle of a piece of work, as W'', which, on account of its peculiar shape, could not be measured between the jaw-faces 4 and 4' of the measuring-tool.

By the construction and organization of the two gage members B and C, herein shown and described, it will be seen that said two members may have their respective faces 4 and 4' separated a greater or less distance to facilitate the measuring of pieces of work of different diameters or sizes, which is materially advantageous in tools of this class. This construction also facilitates the testing or gaging of parallel faces of a piece of work, as well as angular faces—as, for instance, the protractor may be set with its graduation-mark "0" in alinement with the indicator or pointer 9, which brings the two gage-faces 4 and 4′ into parallelism and forms a straight-edge of the two gage-faces 5 and 5′ of the two members B and C, and by adjusting the protractor-carrying slide D longitudinally of the gage member B the length of the straight-edge formed by the two gage-faces 5 and 5′ and the distance between the two gage-faces 4 and 4′ may be increased or decreased as desired.

Having described my invention, I claim—

1. A measuring-tool comprising a gage member or stock having a slideway formed in one face thereof and also having two rectangularly-disposed plane gage-faces, one of which is in parallelism with and extends the length of the slideway and the other of which intersects said slideway; a slide supported in the slideway; and a protractor pivotally carried by said slide and having two angularly-disposed conjugate gage-faces, one of which is settable in alinement with, or at the desired angle relatively to, the longitudinal gage-face of the stock, and the other of which is simultaneously settable in parallelism with, or at a corresponding angle relatively to, the other gage-face of the stock.

2. In a measuring-tool, in combination, a stock having a longitudinal gage-face extending throughout its length and a transverse gage-face and having a slideway formed in one side face thereof, with its longitudinal axis in parallelism with the longitudinal gage-face of the stock; a protractor-carrying slide supported in the slideway, with its side face flush with the side face of the stock; a protractor pivotally carried at the outer end of said slide and having two angularly-disposed conjugate gage-faces, one of which is located at a distance from the pivot of said protractor equal to the distance at which the longitudinal gage-face of the stock is located from the axis of the slideway, and one gage-face of the protractor being settable in alinement with, or at the desired angle relatively to, the longitudinal gage-face of the stock, and the other gage-face of said protractor being simultaneously settable in parallelism with, or at a corresponding angle relatively to, the other gage-face of the stock.

3. The combination, in a measuring-tool, of a gage member or stock having two relatively rectangular plane gage-faces the upper face extending the length of the stock; a slide adjustably mounted on said stock, with its outside face flush with the outside face of said stock; a protractor pivotally carried on the slide, with opposite side faces thereof flush with opposite side faces of said stock, respectively, and having two rectangularly-disposed conjugate gage-faces located in coöperative relation with the two gage-faces of said stock.

4. The combination, in a measuring-tool, with a gage member or stock having an upper plane surface extending throughout its length and constituting a gage-face and also having a projecting arm formed on its inner side and constituting a second gage-face located at right angles to the first gage-face; of a protractor pivotally connected to said stock, with its side faces in a plane coinciding with the plane of the side faces of said stock, and said protractor being provided with two relatively rectangular gage-faces in coöperative relation with the gage-faces of the stock.

5. A measuring-tool comprising a gage member or stock having a slideway formed in one face and extending from end to end thereof and also having two rectangularly-disposed plane gage-faces, one of which extends from end to end of the stock in parallelism with the slideway, and the other of which intersects said slideway; a slide supported in the slideway; a protractor pivotally carried by said slide and having two angularly-disposed conjugate gage-faces, one of which is settable in alinement with, or at a desired angle relatively to, the longitudinal gage-faces of the stock, and the other of which is simultaneously settable in parallelism with, or at a corresponding angle relatively to, the other gage-face of the stock; and means carried by the slide, for clamping the same against longitudinal movement with respect to the stock.

6. In a measuring-tool, in combination, a stock having a longitudinal slideway extending from end to end thereof and also having two conjugate gage-faces, one of which extends from end to end of the stock in parallelism with the slideway, and one of which intersects said slideway; a slide adjustably supported in said slideway, with its side face flush with the faces of the stock and having one end thereof slitted longitudinally and transversely recessed to form resilient arms; a clamping-cam seated in said recess and adapted on rotation to spread the resilient arms, to thereby hold the slide against longitudinal movement in the slideway, said cam having its face at all times flush with the outer face of the slide; and a protractor pivotally carried at the opposite end of said slide and having two rectangularly-disposed conjugate gage-faces, one of which is settable in alinement with, or at a desired angle relatively to, the longitudinal gage-face of the stock, and the other of which is simultaneously settable in parallelism with, or at a corresponding angle relatively to, the other gage-face of the stock.

7. In a measuring-tool, the combination, with a gage member of a stock, having a longitudinal dovetailed slideway in one face thereof, of a slide supported in said slideway, with its outer face flush with the face of the stock and having one end thereof slitted longitudially and conically bored to form resilient walls having a cam-seat between said walls, whose inner end is of greater diameter than the outer end; a conical cam rotatably supported in said seat, with its small end flush with the outer face of the slide, whereby said cam is held in place, and whereby on a rotatable movement of said cam the resilient arms of the slide will be spread to engage and prevent a longitudinal movement of the slide; and a protractor pivotally carried at the outer end of said slide.

RICHARD T. HUNTINGTON.

Witnesses:
FRED. J. DOLE,
HENRY BISSELL.